United States Patent [19]

Toida et al.

[11] 4,145,397
[45] Mar. 20, 1979

[54] PROCESS FOR RECOVERING MOLYBDENUM, VANADIUM, COBALT AND NICKEL FROM ROASTED PRODUCTS OF USED CATALYSTS FROM HYDROTREATMENT DESULFURIZATION OF PETROLEUM

[75] Inventors: Shigeo Toida, Tokyo; Akira Ohno, Ichikawa; Kozo Higuchi, deceased, late of Tokyo, Japan, by Michiko Higuchi, heir at law and legal representative; by Makoto Higuchi, heir at law; by Yuko Higuchi heir at law, both of Tokyo, Japan

[73] Assignees: Marubeni Corporation; Fuji Fine Chemical Co. Ltd., both of Tokyo, Japan

[21] Appl. No.: 821,523

[22] Filed: Aug. 3, 1977

[30] Foreign Application Priority Data

Aug. 6, 1976 [JP] Japan .................................. 51/93242
Aug. 6, 1976 [JP] Japan .................................. 51/93243
Aug. 6, 1976 [JP] Japan .................................. 51/93244

[51] Int. Cl.² ...................... C01G 31/00; C01G 39/00; C01G 51/12; C01G 53/12

[52] U.S. Cl. .................. 423/54; 204/180 R; 423/58; 423/56; 423/61; 423/63; 423/65; 423/67; 423/68; 423/112; 423/127; 423/131; 423/143; 423/139; 423/150

[58] Field of Search .................. 423/54, 55, 56, 58, 423/62, 63, 65, 138, 139, 150, 111, 112, 131

[56] References Cited

U.S. PATENT DOCUMENTS

| | | | |
|---|---|---|---|
| 3,554,692 | 1/1977 | Brust et al. | 423/63 |
| 3,758,566 | 9/1973 | Organ | 423/63 |
| 3,773,890 | 11/1973 | Fox et al. | 423/54 |
| 3,826,809 | 7/1974 | Hardwick et al. | 423/62 |
| 4,075,277 | 2/1978 | Castagna et al. | 423/53 |
| 4,087,510 | 5/1978 | Steinken | 423/53 |

Primary Examiner—Herbert T. Carter
Attorney, Agent, or Firm—Flynn and Frishauf

[57] ABSTRACT

From roasted products of used catalysts from hydrotreatment desulfurization of petroleum, valuable molybdenum, vanadium, cobalt and nickel are recovered easily and a high percent recovery by means of a combination of simple chemical procedures and also inexpensive chemicals. The recovered metal components can be reused for preparing new catalysts and the like.

41 Claims, 3 Drawing Figures

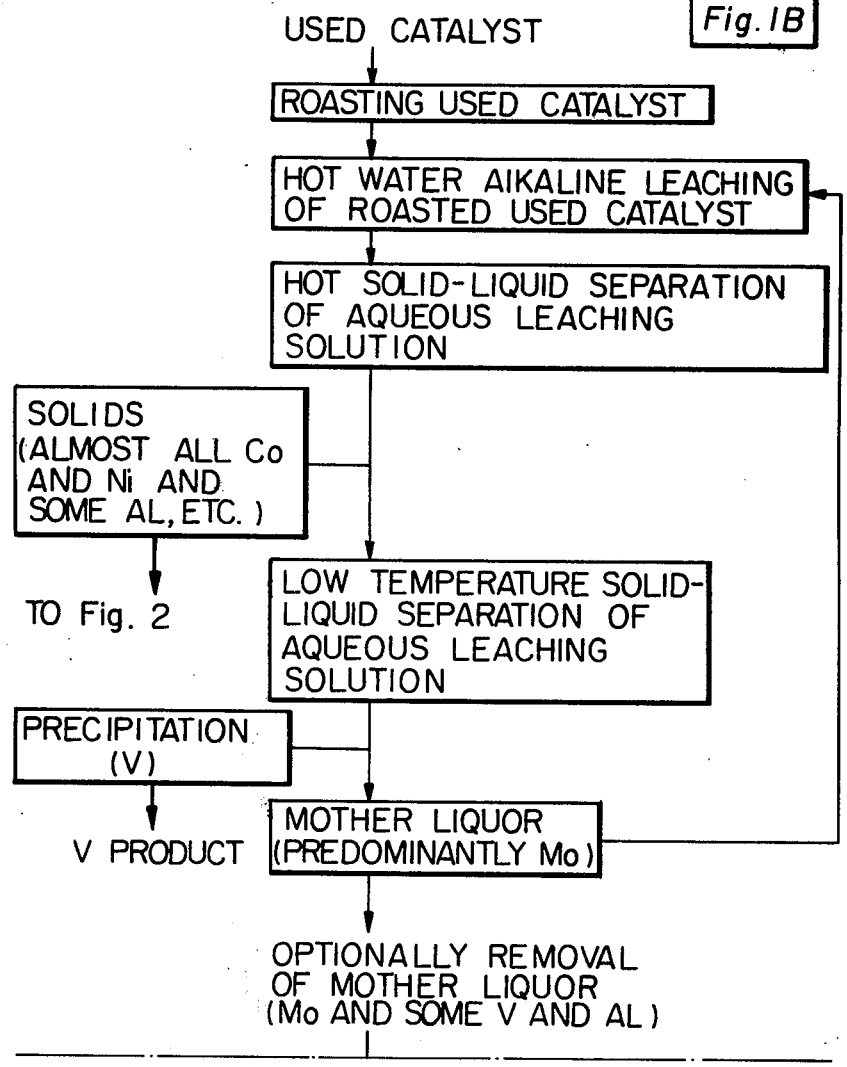

PROCESS FOR RECOVERING MOLYBDENUM, VANADIUM, COBALT AND NICKEL FROM ROASTED PRODUCTS OF USED CATALYSTS FROM HYDROTREATMENT DESULFURIZATION OF PETROLEUM

This invention relates to a process for recovering molybdenum, vanadium, cobalt and nickel from products obtained by oxidative roasting, at a temperature of from about 600° C. to about 950° C., of used catalysts from the hydrotreatment desulfurization of petroleum.

A number of processes have been proposed for the leaching and separation of vanadium and molybdenum components from products containing said values obtained by oxidative roasting of used catalysts such as used desulfuration catalysts of petroleum. Such roasted products normally contain ingredients such as nickel, cobalt and the like as well as aluminium derived from the carrier. It is thus difficult to leach and separate the vanadium and molybdenum values by a simple process with high leaching and separation efficiency. Accordingly, such leaching and separation have not been put successfully into practical use.

Such known proposals include processes wherein such used catalyst is subjected to oxidation calcination with an alkali such as caustic soda, sodium carbonate or the like under the fusing condition of the alkali and the resulting calcinated product is leached with an ammonia solution under pressure or with water. Such processes have a number of disadvantages such as it is difficult and inefficient to separate vanadium and molybdenum values from such calcinated products obtained under fusing condition of the alkali in an oxidative atmosphere, there is a large amount of liquid to be treated, and sticky materials tend to form during the calcination. Hence such processes are not suitable for commercial application. Although, according to Japanese Patent Public Disclosure No. 11995/1975 for an improvement in oxidative calcination of a spent catalyst in the co-fushion conditions with sodium sulfate, the disadvantageous formation of sticky material can be eliminated during such calcination, the poor separation efficiency cannot be avoided. In fact in this Disclosure, no separation of vanadium component from molybdenum component is carried out. In order to separate such components, it has been proposed in Published Japanese Patent Public Disclosure No. 2611/1975 to leach and separate such components by treating a liquor containing both of the components with an organic solvent of light mineral oil containing a higher trialkylamine and a water-immiscible monovalent higher alcohol at a pH condition of less than 1.5. Such a proposal has, however, a disadvantage in that it needs an organic solvent which is difficult to recover and, also, it is unsuitable for commercial practice from the viewpont of environmental pollution. In addition it requires multiple leaching and separation and the separation efficiency is not satisfactory.

It has been known to separate nickel from cobalt each in the form of solution containing the chlorocomplex ion as an analytical procedure. This procedure takes advantage of the fact that chlorocomplexed nickel ion acts as a cation and chlorocomplexed cobalt ion acts as an anion in a concentrated hydrochloric acid solution, and the chlorocomplexed cobalt ion is adsorbed selectively on an anion exchange resin to elute chlorocomplexed nickel ion and the adsorbed chlorocomplexed cobalt ion is eluted by using hydrochloric acid. However, this procedure has not been put into practical use in the commercial separation of nickel from cobalt, because the use of a concentrated hydrochloric acid damages equipment and causes trouble in operations.

It is an object of our invention to provide a process for recovering valuable molybdenum, vanadium, cobalt and nickel from roasted products of used catalysts from hydrotreatment desulfurization of petroleum by simple chemical procedures in combination with the use of inexpensive chemicals.

It is another object of our invention to provide a process for separating mother liquor containing almost all of molybdenum and vanadium components and some aluminum component dissolved therein from solids including most of cobalt and nickel components and some aluminum component and the like from a hot water alkaline leaching solution of roasted products of used catalysts from hydrotreatment desulfurization of petroleum by simple chemical procedures in combination with the use of inexpensive chemicals.

It is still another object of our invention to provide a process for separating and collecting a molybdenum component and a vanadium component respectively, from mother liquor containing molybdenum and vanadium components and some aluminum component dissolved therein by simple chemical procedures in combination with the use of inexpensive chemicals.

It is still another object of our invention to provide a process for separating and collecting a cobalt component and a nickel component respectively, from solids including the cobalt and nickel components and some aluminum component and the like by simple chemical procedures in combination with the use of inexpensive chemicals.

Other objects and advantages of the present invention will become apparent to those skilled in the art from the following description and disclosure.

This invention relates to a process for recovering molybdenum, vanadium, cobalt and nickel from products obtained by oxidative roasted, at a temperature of from 600° C. to about 950° C., of used catalysts from the hydrotreatment desulfurization of petroleum.

The roasted products are subjected to hot water alkaline leaching. The resulting aqueous leaching solution containing most of molybdenum and vanadium components and some aluminum component dissolved therein is separated from solids including most of cobalt and nickel components and some aluminum component and the like. The resulting aqueous leaching solution is cooled to precipitate and separate the vanadium component therefrom. The mother liquor resulting from preceding step and containing mainly the molybdenum component is recycled to effect the hot water alkaline leaching of other roasted products. The recycled leaching and separation are repeated under the condition that the molybdenum content accumulated in the mother liquor by repeated leaching does not exceed about 7% by weight based on the mother liquor and the moter liquor is optionally removed.

The mother liquor containing molybdenum component and some vanadium and aluminum components is subjected to dealkalization by a non-neutralization procedure such as electrodialysis or treatment through a cation exchange resin, then sulfuric acid or hydrochloric acid is added thereto to form and remove solids of aluminum component. A water-soluble ammonium salt is added to the resulting liquor from the preceding step to convert the molybdenum component and some vanadium component to their ammonium salts by double decomposition. The precipitated ammonium salt of vanadium component is subjected to hot solid-liquid separation. The residual mother liquor is cooled to precipitate and separate the ammonium salt of molybdenum therefrom.

The solids including most of cobalt and nickel components and some aluminum component and the like are subjected to hot water acid leaching. The resulting aqueous leaching solution is separated from solid residue. The aqueous leaching solution is recycled to the hot water acid leaching to effect the hot water acid leaching of other solids including most of cobalt and nickel components and some aluminum component and the like. The recycled leaching step is repeated several times and separating and leaching liquid is removed optionally. The leaching liquid is oxidized with an oxidizing agent and neutralized with an alkali, thereby precipitating aluminum, vanadium and molybdenum hydroxides. The resulting precipitate above is filtered. Alternatively, molybdenum and vanadium components are separated by the use of a cation exchange resin, from nickel, cobalt and aluminum adsorbed thereon. An ammonium salt and ammonium hydroxide are added to nickel and cobalt components to form ammonia complex divalent nickel and cobalt. The aqueous solution containing ammonia complex ions of divalent nickel and cobalt is oxidized with molecular oxygen or a molecular oxygen-containing gas to form selectively ammonia complex ion of trivalent cobalt. The resulting solution is contacted with a weakly acidic cation exchange resin to absorb the ammonia ions thereon, followed by eluting with a buffering solution containing a water-soluble ammonium salt under an ammonia alkaline condition to elute selectively the ammonia nickel complex ion and then eluting the ammonia coblat complex ion.

FIG. 1A is a schematic flow diagram illustrating the processing steps for effecting hot water alkaline leaching of roasted used catalysts from hydrotreatment desulfurization of petroleum, to separate and collect mother liquor containing most molybdenum component and some vanadium and aluminum components and solids including most of cobalt and nickel components and some aluminum component, etc. respectively, from the leaching liquid.

Figure 1B:
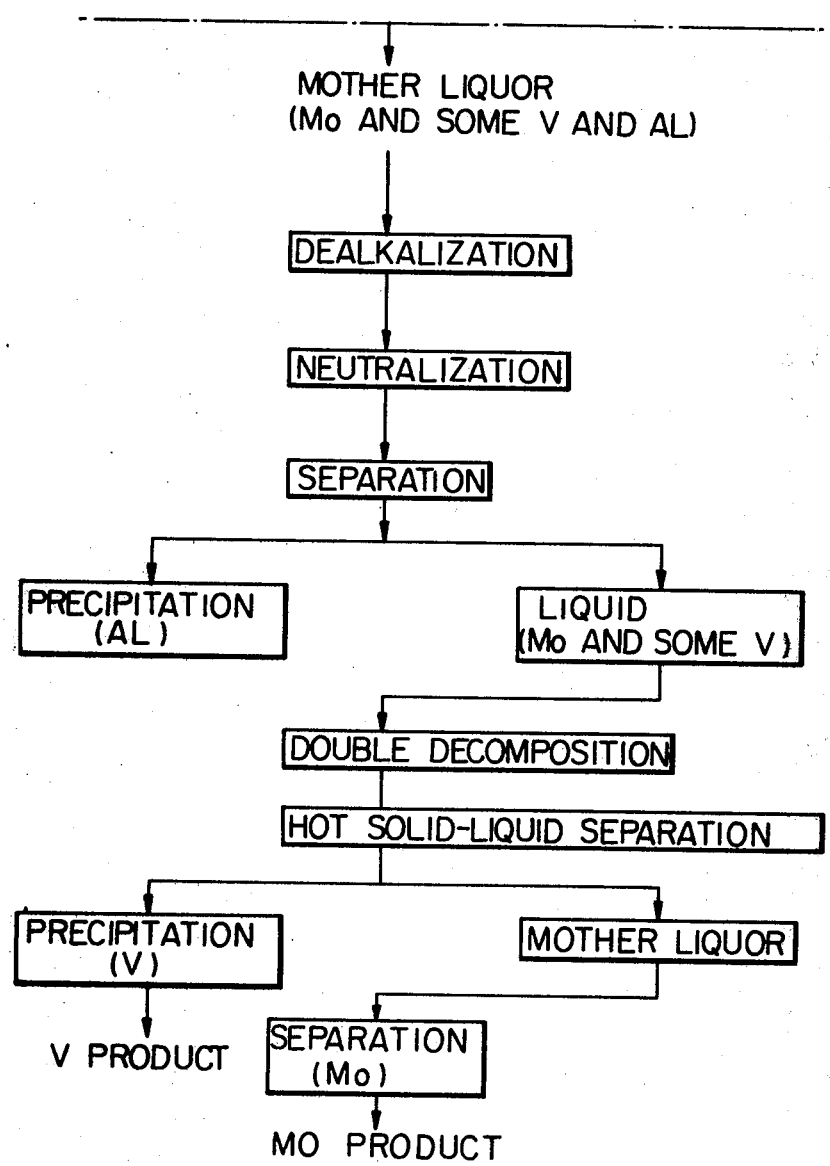
FIG. 1B is a schematic flow diagram illustrating the processing steps of separating and collecting molybdenum and vanadium components respectively, from the mother liquor containing most of molybdenum component and some vanadium and aluminum components.
Figure 2:
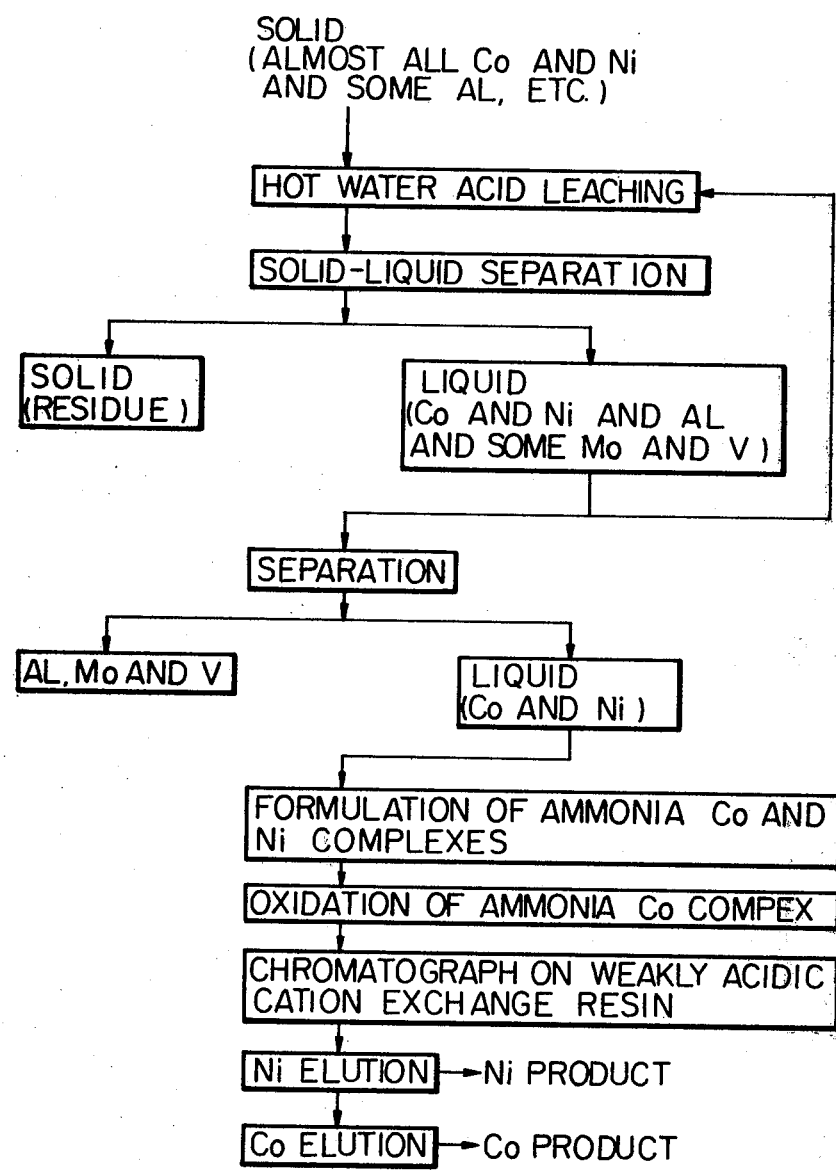
FIG. 2 is a schematic flow diagram illustrating the processing steps for effecting hot water acid leaching of solids including most of cobalt and nickel components and some aluminum component, etc., to separate and collect cobalt component and nickel component respectively, from the leaching liquid.

The oxidative roasting of used hydrotreatment desulfurization catalyst is carried out in the presence of molecular oxygen, normally in air to oxidize and burn carbonaceous organics and sulfur contained in the catalyst to remove them in the form of carbon dioxide and sulfur dioxide. It is preferred to effect simple oxidative roasting without adopting the co-fusion with an alkali as is done in conventional processes. The oxidative roasting is normally carried out at a temperature ranging from about 600 to about 950° C. The resulting oxidative roasted products contain normally vanadium and molybdenum in the form of their oxides together with Co, Ni, Al components. It generally contains V in an amount ranging from about 10% to about 20%, Mo in an amount ranging from about 4% to about 8%, Co in an amount ranging from about 2% to about 4% and Ni in an amount ranging from about 1% to about 2%.

In the process of the invention, the oxidative roasted products containing vanadium and molybdenum values is subjected to hot water alkaline leaching at a temperature higher than about 50° C., preferably at a temperature of from about 50° C. to about 100° C., more preferably at a temperature of from about 55° C. to about 80° C. in the presence of a caustic alkali, for example in the presence of caustic soda as shown in the extraction step (a). During the leaching, the leaching liquid system is adjusted so that the concentraion of free caustic alkali contained therein is higher than about 10% by weight based on the weight of the leaching system. The upper limit of the concentration is not critical but the use of a higher concentration is economicaly disadvantageous so that the concentration range is preferably from about 10% to about 30%, more preferably from about 10% to about 25%. If the concentration of the free caustic alkali is lower than about 10%, the deposition of an alkali salt of vanadium such as $NaVO_3$ will become undesirably difficult in the later solid-liquid separation of the liquid phase containing vanadium and molbdenum values as shown in Step (c) and the leaching efficiency will be decreased in the leaching of vanadium and molybdenum values from the oxidative roasted products. it is thus essential to effect the leaching under the condition that there exists the free caustic alkali in a concentration higher than about 10%.

The aqueous liquid obtained by the hot water alkali leaching and containing vanadium and molybdenum values is subjected to hot solid-liquid separation at a temperature higher than that for the substantial deposition of the vanadium and molybdenum values dissolved therein, for example at a temperature of from about 40 to about 100° C., preferably from about 50° to about 80° C. and more preferably from about 55° to about 75° C. to collect the liquid phase as shown in the separation step (b). Such separation may be carried out by separating and collecting the liquid phase in said hot water alkaline leaching zone or by providing a separate separation zone. The solid phase including most Co and Ni components and some Al component, etc. is removed from the system. The valuable Ni and Co values can be recovered from the solid phase by the undermentioned process.

Said vanadium value can be separated and collected as solids of an alkali salt such as $NaVO_3$ by solid-liquid separation of the liquid phase obtained by the preceding step at a temperature lower than that at which said vanadium value is deposited but showing substantially no molybdenum value as shown in the lower temperature solid-liquid separation step (c). In the lower temperature separation step, a temperature lower than 40° C., normally from about 0° C. to about 40° C. is used. An alkali salt of vanadium can be easily precipitated out from the alkaline liquid phase at a temperature lower than 40° C., whereas molybdenum is present in the form of an alkali salt, for example, in the form of $Na_2MoO_4$, normally as its hydrate which does not substantially precipitate out at a temperature higher than about 0° C. so that such a low temperature condition can be optionally selected and utilized. The precipitation of the molybdenum value also depends on the temperature, pH condition and the like in the system, but the optimum temperature can be easily determined by experimentation. Room temperature is used most conveniently but the separation can be carried out at a temperature lower than room temperature up to about 0° C. by force cooling the liquid phase. As a guide indication, it is preferred to select a temperature at which a minor amount of vanadium value remains in the mother liquor phase containing predominantly molybdenum value after the separation but as little molybdenum value as possible to be entrained in the alkali salt of vanadium value separated from the mother liquor as solids. The solid phase comprises $NaVO_3$ hydrate having a plurality of about 85% or more, more frequently a purity of about 90%, which may be recovered as crystals having a purity of higher than 99%, for example, a plurality of 99.5% or higher by recrystallizing from an aqueous solution of a caustic alkali, for example an aqueous solution of caustic soda in a concentration from about 10 to about 30%. If desired, the recovered alkali vanadate may be subjected to double decomposition with an inorganic or organic ammonium salt to convert it to ammonium vanadate. Alternatively, the vanadate may be converted to vanadic acid by decomposing it with a mineral acid such as sulfuric acid or hydrochloric acid.

After such separation of the vanadium value, the resulting mother liquor contains predominantly the molybdenum value, which is then recycled to the hot water alkaline leaching step (a) to extract freshly added raw stock of roasted products. It is necessary to carry out the hot water alkaline leaching by keeping the above-specified free caustic alkalinity condition. This may be done by replenishing optionally the caustic alkali and water correspondingly to the water removed from the system and the free caustic alkali consumed through the systems. Preferably, the caustic alkali and water or an aqueous caustic alkali may be replenished to any point after the low temperature separation step (c) to repeat the hot water alkaline leaching step (a). More generally such a solution may be added into the recycling mother liquor or to the leaching zone.

The recycled leaching and separation operations are repeated under the condition that the amount of molybdenum value accumulated in the system by the recycled leaching does not exceed about 7% by weight calculted as Mo and based on the weight of said liquid phase resulted from the hot separation step (b) and containing vanadium and molybdenum values by removing a portion of the mother liquor containing predominantly the accumulated molybdenum value. If the Mo content becomes higher than about 7% by weight of the liquid phase containing the molybdenum value, the molybdenum value tends to contaminate the vanadium value precipitated during the low temperature separation step (c). Thus it is essential to control the Mo content under the specified condition.

The fluidity of the mother liquor containing strongly alkaline Mo, and some Al and V and having a pH higher than 13, normally higher than about 14, is adjusted, if necessary, by adding water and then subjecting to dealkalization by a non-neutralization. If the solution is neutralized by adding an acid or subjected to double decomposition by adding a water-soluble ammonium salt into the solution, V of high purity cannot be separated from the Mo with high efficiency in high yields. Particularly, if the alkaline treatment is carried out by neutralization with a mineral acid or such treatment is omitted, the ammonium salt derived from the mineral acid used for the formation of solids containing the aluminium will be disadvantageously co-precipitated in the separation step of ammonium salts of molybdenum. It is thus necessary in the process of the invention to carry out the dealkalization of aqueous alkaline solution to be treated by a non-neutralization process. The dealkalization is carried out so that the pH of the resulting solution is higher than about 11 but less than 13. If the dealkalization is carried out so that the pH of the resulting solution is less than about 11, for example of 10.5, the aluminium will be precipitated out during the dealkalization step to cause operational trouble. If the dealkalization is carried out insufficiently so the pH of the resulting solution is higher than 13, the resulting Mo and V values are contaminated with the co-produced salts as if the aqueous alkaline solution were subjected to direct double decomposition with an ammonium salt. Hence in the process of the invention, the aqueous alkaline solution is treated with dealkalization process of non-neutralization so that the pH of the resulting solution is held within the narrow range between higher than about 11 and less than about 13, preferably from about 11 to about 12.

Such dealkalization may be carried out by any known non-neutralization process such as electrodialysis, treatment through a cation exchange resin or the like. After being subjected to non-neutralization dealkalization, a mineral acid such as fulfuric acid or hydrochloric acid is added to the resulting solution to adjust the pH of the solution to within from about 7.5 to about 9.5, preferably from about 8 to about 9. In the commercial practice, it is preferred to use sulfuric acid. The aluminium in the solution is precipitated as aluminium-containing solids mainly in the form of aluminium hydroxide together with contaminants by the pH adjustment, which are then removed from the system. Such separation may be carried out at room temperature. If the pH is adjusted to a value lower than 7 or less by the addition of a mineral acid, the V and/or Mo values are coprecipitated with the aluminium-containing solids. If the pH is higher than about 9.5, not enough of the aluminium-containing solids are precipitated, so that V and Mo values of high purity cannot be separated.

The resulting liquid phase obtained by the preceding pH adjustment contains V and Mo values but substantially no Al. It is then subjected to double decomposition with a water-soluble ammonium salt. The double decomposition may be performed simply by adding a water-soluble ammonium salt. Such a salt may be added in the form of a solution containing the salt. The ammonium salt is added preferably in an amount calculated as $NH_4^+$ of more than one mol per mil of V value calculated as V, for example in an amount of 1 to 3 mols and in an amount of more than 2 mols per mol of Mo value calculated as Mo, for example in an amount of 2 to 3 mols. The double decomposition requires no heating, but if desired it can be performed under heating.

Water-soluble ammonium salts usable in the double decomposition include inorganic ammonium salts such as chloride, nitrate, sulfate, carbonate and the like and organic ammonium salts such as acetate, oxalate and the like. In commercial practice, ammonium sulfate is preferably used. By the double decomposition, the V and Mo values present in the liquid phase as alkali vanadates and molybdates are converted to the ammonium salts. After the double decomposition, the precipitated ammonium vanadates, if necessary, are separated from the system by concentrating the liquid phase, The separation is carried out preferably at a temperature at which ammonium vanadates are selectively precipitated out but substantially no ammonium molybdates are precipitated. The separation is normally carried out at a temperature higher than about 40° C., for example from about 40° C. to about 100° C., more preferably from about 50° C. to about 80° C. Room temperature or less may be employed, but it is preferred to concentrate the mother liquor phase for the separation step of the molybdates in order to effect sufficiently the precipitation of the Mo value from the mother liquor phase so that the hot separation of vanadates is preferred commercially in order to reduce the heat loss The residual mother liquor after the separation of vanadates is then concentrated, if necessary and cooled to room temperature or less, from about room temperature to about 0° C. The precipitated ammonium molybdates are separated.

Aforementioned solids including most of the Co and Ni components and some Ae component and the like are subjected to hot water acid leaching at a temperature of from about 50° C. to about 100° C., in the presence of an acid such as sulfuric acid or hydrochloric acid, the concentration of the free acid in the leaching liquid being adjusted to a level of from about 2% to about 10%, preferably of from about 4% to about 6% by weight based on the weight of said leaching liquid. The resulting aqueous leaching solution containing Co, Ni and Al components and some Mo and V components and some Mo and V components is separating from the solid residue. The aqueous leaching solution from the preceding step is recycled to the hot water acid leaching step to effect the hot water and acid leaching of other solids including most of the Co and Ni components and some Al component and the like as above, while maintaining the acid condition of said solution. The recycled leaching is repeated several times and said aqueous leaching solution is separated and optionally removed. The leaching liquid is oxidized with an oxidizing agent such as $H_2O_2$, NaClO or $KMnO_4$, and then it is neutralized with an alkali such as NaOH, KOH or $NH_4OH$ to a pH of from about 3.5 to about 5.5, thereby precipitating Al, V and Mo hydroxides. The resulting precipitate is filtered to get a solution containing Ni and Co components. Alternatively, Al, V and Mo components which are included in said leaching liquid may be removed by the following procedure. The leaching solution is oxidized with an oxidizing agent such as $H_2O_2$, NaClO or $KMnO_4$, and is neutralized with an alkali such as NaOH, KOH or $NH_4OH$ to a pH of from about 1 to about 2, and then is passed through a cation exchange resin, thereby adsorbing Ni, Co and Al components, but not adsorbing Mo and V components. The adsorbed ingredients are eluted with about 5% to about 30% by weight of sulfuric acid or hydrochloric acid and then the elute is subjected to electrodialysis to adjust the pH to about 1 to about 2. The resulting liquid is neutralized with an alkali such as NaOH, KOH or $NH_4OH$ and the resulting precipitate of Al component is filtered to get a solution containing Ni and Co components. When $NH_4OH$ is used as a neutralizing agent, the addition of an ammonium salt in the following step may be omitted.

Such raw materials containing Ni and Co or those treated to remove contaminants therefrom are treated with an aqueous ammonium hydroxide solution containing an ammonium salt, for example, by the dissolution, leaching or the like to prepare easily a solution of ammonia-complexed nickel and cobalt ions. Usable ammonium salts may include water-soluble inorganic ammonium salts such as sulfate, nitrate, chloride, carbonate, phosphate and the like, and water-soluble organic ammonium salts such as acetate, oxalate and the like.

In the process according to the invention, such an aqueous solution containing ammonia-complexed divalent nickel and cobalt is oxidized with molecular oxygen or a molecular oxygen-containing gas such as air. The oxidation may be performed by bubbling such a gas into the aqueous solution. As the oxidation proceeds at room temperature, heating or cooling is not required for the reaction, but, if desired, the aqueous solution may be warmed or cooled. The oxidation will proceed if the aqueous solution containing ammonia-complexed divalent nickel and cobalt stands in air, and such spontaneous oxidation may be adopted, if desired. The oxidation of said ammonia complex ions proceeds selectively for converting the ammonia-complexed divalent cobalt to the ammonia-complexed trivalent cobalt. For example, ammonia-complexed divalent cobalt $[Co(NH_3)_6]^{2+}$ is selectively oxidized in an aqueous solution prepared by using an aqueous ammonia solution containing ammonium sulfate and having a pH higher than about 10 and containing ammonia-complexed divalent ions of $[Co(NH_3)_6]^{2+}$ and $[Ni(NH_3)_6]^{2+}$ to divalent complex ions of $[Co(NH_3)_5(H_2O)]^{3+}$ and/or $[Co(NH_3)_6]^{3+}$.

In the process of the invention, the solution subjected to such selective oxidation is then subjected to adsorption using a weakly acidic cation exchange resin adsorbent. The ammonia-complexed divalent nickel ion and trivalent cobalt ion are adsorbed on the adsorbent by such adsorption treatment. However, more of the trivalent cobalt complex ion is adsorbed than of the divalent nickel complex ion due to the difference of their adsorption capacities. When the resulting adsorbent is eluted with a buffering solution containing a water-soluble ammonium salt under an ammonia alkaline condition, the divalent nickel complex ion is eluted selectively. As a water-soluble ammonium salt, any one of the above-specified ammonium salts can be used. After the elution of divalent nickel complex ion, the adsorbent is eluted, for example, with a buffering solution containing a water-soluble ammonium salt under an ammonia alkaline condition to obtain the ammonia-complexed trivalent cobalt ion. As a buffering solution containing a water-soluble ammonium salt, the above-mentioned aqueous ammonium hydroxide solution containing a water-soluble ammonium salt is also preferably used. The concentration of the water-soluble ammonium salt may be changed depending on the type of salt. Said ammonium salt may be used in a concentration ranging from about 0.2 to about 0.9 mols, more preferably from about 0.4 to about 0.7 mols as ammonium ion. The pH of the aqueous solution should be an alkaline condition and preferably from about 8 to about 12, more preferably from about 9 to about 11. For the elution of the ammonia-complexed trivalent cobalt ion after the elution of ammonia-complexed divalent nickel ion, similar aqueous buffering solution containing a water-soluble ammonium salt may be used, preferably at a higher concentration than that for the elution of divalent nickel complex ion, for example, within the range of from about 0.7 to about 2.5 mols of ammonium ion of the ammonium salt. Alternatively, the elution may be accomplished with an aqeuous mineral acid. There is thus no special restriction on the solution for the elution of the trivalent cobalt complex ion and any solution which can elute the trivalent cobalt complex ion may be used. The elution may be preformed at room temperature.

cedure. The percent leaching of V, Mo and Al was 50.02%, 80.65% and 0.69%, respectively. Table 2 shows results obtained by repeating such a procedure five times.

TABLE 2

|  |  | V | Mo | Co | Ni | Al |
|---|---|---|---|---|---|---|
| 1st Leaching | Leached Liquid | 2.40%<br>10.32 g | 1.75%<br>7.53 g | 0.003%<br>0.013 g | ~ 0 | 0.14%<br>0.60 g |
|  | Crystals | 87.5 g |  |  |  |  |
|  | Filtrate | 0.46%<br>1.78 g | 1.55%<br>6.01 g | 0.0005%<br>0.002 g | ~ 0 | 0.15%<br>0.58 g |
| 2nd Leaching | Leached Liquid | 2.63%<br>10.73 g | 3.14%<br>12.80 g | 0.001%<br>0.004 g | 0.0008%<br>0.003 g | 0.24%<br>0.98 g |
|  | Crystals | 88.5 g |  |  |  |  |
|  | Filtrate | 1.11%<br>3.94 g | 3.30%<br>11.7 g | 0.0006%<br>0.002 g | 0.0007%<br>0.002 g | 0.29%<br>1.03 g |
| 3rd Leaching | Leached Liquid | 2.78%<br>10.84 g | 4.47%<br>17.43 g | 0.0007%<br>0.002 g | 0.0007%<br>0.002 g | 0.34%<br>1.33 g |
|  | Crystals | 92.6 g |  |  |  |  |
|  | Filtrate | 1.33%<br>4.54 g | 4.46%<br>15.21 g | 0.0005%<br>0.002 g | ~ 0 | 0.35%<br>1.19 g |
| 4th Leaching | Leached Liquid | 2.63%<br>11.52 g | 4.83%<br>21.68 g | 0.0006%<br>0.003 g | 0.0005%<br>0.002 g | 0.34%<br>1.49 g |
|  | Crystals | 51.5 g |  |  |  |  |
|  | Filtrate | 1.57%<br>6.59 g | 4.83%<br>20.29 g | 0.0006%<br>0.003 g | 0.0005%<br>0.002 g | 0.35%<br>1.47 g |
| 5th Leaching | Leached Liquid | 3.16%<br>14.22 g | 5.99%<br>26.96 g | 0.0008%<br>0.004 g | 0.0007%<br>0.003 g | 0.38%<br>1.71 g |
|  | Crystals | 85.0 g |  |  |  |  |
|  | Filtrate | 2.15%<br>8.75 g | 6.18%<br>25.15 g | 0.0004%<br>0.0002 g | 0.0006%<br>0.0002 g | 0.42%<br>1.71 g |

Nickel and cobalt values separated by the process according to the invention in the form of ammonia complex ions can be converted into the oxides or hydroxides by any conventional procedure, for example, by thermal decomposition. If desired, such complex ions may be converted to nickel sulfate and cobalt sulfate by any conventional procedure.

Embodiments of this invention are illustrated in detail in the following examples. It should be understood that this invention is, however, in no way limited by the examples, which are given only for the purpose of illustration of this invention.

EXAMPLE 1

A used catalyst from the direct desulfurization of petroleum was roasted at 800° C. in an oxidative atmosphere. The roasted product had a composition as shown in Table 1.

TABLE 1

| V (%) | MO (%) | Co (%) | Ni (%) | Al (%) |
|---|---|---|---|---|
| 10.88 | 5.49 | 2.03 | 1.94 | 35.48 |

To the roasted product (150g) was added 15% aqueous solution of NaOH (500 ml) and extracted at about 60° C. for 3 hours under agitation of the mixture under the condition that the free NaOH was at a value of about 15% in the leaching system. Immediately thereafter, the reaction mixture was filtered at that temperature to obtain the filtrate at about 50° C. The filtrate was then cooled to about 5° C. to precipitate hydrated sodium vanadate crystals, which were then filtered to obtain the crystals. A 50% aqueous NaOH and water was then added to the mother liquor to adjust the free NaOH concentration at 15% and the amount of the motor liquor to 500 ml. The controlled mother liquor was recycled to the leaching system to effect the roasted product (150 g) similarly to the foregoing pro- After the fifth leaching, the mother liquor containing about 6.2% of molybdenum was obtained.

The analytical data of the crystals are shown in Table 3.

The metals obtained as a crystal were V: 75.39% and Mo: 8.22%, respectively, by weight based on the weight of their components in the leaching liquid.

TABLE 3

|  | V | Mo | V : Mo |
|---|---|---|---|
| 87.5 g of No. 1 Crystals | 7.90 g | 0.33 g | 23.9 : 1 |
| 88.5 g of No. 2 Crystals | 6.73 g | 0.60 g | 11.2 : 1 |
| 92.6 g of No. 3 Crystals | 6.33 g | 0.73 g | 8.8 : 1 |
| 51.5 g of No. 4 Crystals | 4.40 g | 0.03 g | 14.7 : 1 |
| 85.0 g of No. 5 Crystals | 5.40 g | 0.70 g | 7.8 : 1 |

The crystals obtained by the first separation as shown in Table 3 were then recrystallized from 15% NaOH. The crystals obtained by the second separation were recrystallized from the mother liquor from the first recrystallization. Such recrystallization was repeated to the crystals obtained by the final separation. The recrystallized products have the compositions as shown in Table 4.

TABLE 4

|  | V | Mo | V/Mo |
|---|---|---|---|
| No. 1' | 6.33 g | 0.012 g | 543.0 |
| No. 2' | 7.58 g | 0.015 g | 505.3 |
| No. 3' | 7.95 g | 0.016 g | 512.0 |
| No. 4' | 3.50 g | 0.007 g | 521.4 |
| No. 5' | 7.84 g | 0.014 g | 560.0 |

COMPARATIVE EXAMPLE 1

Using No. 5 filtrate in Table 1, the leaching of the calcination product was repeated further by the procedures as disclosed in Example 1 to obtain results as shown in Table 5.

TABLE 5

|  |  | V | Mo | Co | Ni | Al |
|---|---|---|---|---|---|---|
| 6th Leaching | Leached Liquid | 3.59% 14.79 g | 7.85% 32.35 g | 0.0009% 0.004 g | 0.0008% 0.003 g | 0.43% 1.78 g |
|  | Crystals | 86.0 g |  |  |  |  |
|  | Filtrate | 2.46% 9.25 g | 7.51% 28.16 g | 0.0008% 0.003 g | 0.0005% 0.002 g | 0.48% 1.77 g |
| 7th Leaching | Leached Liquid | 3.40% 14.60 g | 7.74% 33.28 g | 0.0011% 0.005 g | 0.0009% 0.004 g | 0.43% 1.83 g |
|  | Crystals | 89.0 g |  |  |  |  |
|  | Filtrate | 2.46% 9.38 g | 7.43% 28.38 g | 0.0010% 0.004 g | 0.0008% 0.003 g | 0.47% 1.81 g |
| 8th Leaching | Leached Liquid | 3.37% 14.95 g | 7.64% 33.84 g | 0.0010% 0.004 g | 0.0008% 0.004 g | 0.47% 1.89 g |
|  | Crystals | 85.0 g |  |  |  |  |
|  | Filtrate | 2.42% 9.50 g | 7.56% 29.71 g | 0.008% 0.003 g | 0.008% 0.003 g | 0.48% 1.87 g |

Table 6 shows analytical results of the crystals.

TABLE 6

|  | V | Mo | V : Mo |
|---|---|---|---|
| No. 6 Crystals | 4.99 g | 3.35 g | 1.5 : 1 |
| No. 7 Crystals | 4.70 g | 3.92 g | 1.2 : 1 |
| No. 8 Crystals | 4.91 g | 3.30 g | 1.5 : 1 |

COMPARATIVE EXAMPLE 2

The roasted product as shown in Example 1 was subjected to single leaching with aqueous NaOH solutions containing 5% and 7% free NaOH, respectively. Table 7 shows results obtained together with data obtained with a solution containing 15%, 20% and 30% NaOH in accordance with the present invention for facilitating comparison.

TABLE 7

| Free NaOH | V | Mo | Co | Ni | Al |
|---|---|---|---|---|---|
| 30% NaOH (Subject Invention) | 2.21% 14.4 g | 1.09% 7.1 g | ~0 | ~0 | 0.16% 1.05 g |
| 20% NaOH (Subject Invention) | 2.04% 13.9 g | 1.13% 7.68 g | 0.024% 0.16 g | ~0 | 0.099% 0.67 g |
| 15% NaOH (Subject Invention) | 2.13% 13.87 g | 1.18% 7.68 g | 0.005% 0.038 g | 0.004% 0.026 g | 0.12% 0.78 g |
| 7% NaOH (Comparative Example) | 1.49% 9.12 g | 1.11% 6.79 g | ~0 | ~0 | 0.018% 0.11 g |
| 5% NaOH (Comparative Example) | 1.49% 8.34 g | 1.11% 6.22 g | ~0 | ~0 | 0.013% 0.073 g |

TABLE 8

| The percent leaching at 15% free NaOH | | |
|---|---|---|
| V | Mo | Al |
| 84.99% | 93.32% | 1.46% |

When the filtrates of the extracts with 5% and 7% NaOH were cooled to 5° C., no precipitation of crystals was observed from either of the filtrates, whereas about 33 g of hydrated sodium vanadate was precipitated out from the filtrate obtained according to the invention.

EXAMPLE 2

Electrodialysis was applied to 407 ml of the mother liquor obtained by repeating the leaching procedure five times (refer to TABLE 2, 5th filtrate in EXAMPLE 1) to effect the dealkalization to reduce the pH to about 11.5. The leaching was treated with 10% aqueous $H_2SO_4$ to adjust the pH to a value of about 9 to precipitate aluminium hydroxide, which was then filtered off. Table 9 shows the composition of the filtrate.

TABLE 9

|  | V | Mo | Al |
|---|---|---|---|
| Filtrate of 455 ml | 1.56% 7.12 g | 5.21% 23.7 g | 0 0 |

To the filtrate was added 200 ml of 40% aqueous $NH_4Cl$ solution which contained about 1.5 mols of ammonium ion ($NH_4^+$) per mol of V value calculated as V and about 3 mols of $NH_4^+$ per mol of Mo value calculated as Mo. After the double decomposition, the reaction mixture was concentrated to one-half volume. Immediately after the concentration, the precipitated crystals (17.5 g) were filtered off. Table 10 shows analytical data of the crystals and the composition of the filtrate. The percent recovery of V from the mother liquor was 77.9%.

TABLE 10

|  | V | Mo |
|---|---|---|
| Crystals | 6.82 g | 0.02 g |
| Filtrate of 320 ml | 0.09% 0.30 g | 7.3% 23.5 g |

The filtrate was further concentrated and then cooled to 5° C. Table 11 shows analytical data of the resulting crystals (41.7 g).

TABLE 11

| V | Mo |
|---|---|
| 0.26 g | 16.15 g |

The percent recovery of V and Mo from the used catalyst according to subject invention was 42.20% and 39.25%, respectively.

EXAMPLE 3

500 ml of an aqueous solution containing 5% by weight of $H_2SO_4$ and having a pH of 0.52 was added to the leaching residual (120 g) which Mo and V components was leached and separated from the used catalyst at about 15% of free NaOH in Example 1, and leached at 60° C. for three hours under agitation. Immediately after the leaching, the reaction mixture was filtered. The filtrate had a pH of 0.82 and a temperature of 50° C. 50% $H_2SO_4$ and water was added to the filtrate to make 500 ml, so that the resulting solution had a pH of 0.52 and the leaching was repeated using the made-up solution similarly to the foregoing procedure. Table 12 shows the data obtained when such an leaching was repeated five times. The percent leaching of V, Mo, Co, Ni and Al was 6.12%, 4.88%, 47.69%, 15.80% and 1.71%, respectively.

TABLE 12

| | V | Mo | Co | Ni | Al |
|---|---|---|---|---|---|
| 1st leaching 437 ml | 0.19% 0.83 g | 0.024% 0.10 g | 0.36% 1.57 g | 0.13% 0.57 g | 0.23% 1.01 g |
| 2nd leaching 484 ml | 0.47% 2.27 g | 0.13% 0.63 g | 0.79% 3.82 g | 0.24% 1.16 g | 0.40% 1.94 g |
| 3rd leaching 420 ml | 0.87% 3.65 g | 0.23% 0.97 g | 1.19% 5.00 g | 0.41% 1.72 g | 0.67% 2.81 g |
| 4th leaching 450 ml | 1.03% 4.65 g | 0.31% 1.38 g | 1.51% 6.81 g | 0.45% 2.03 g | 0.80% 3.60 g |
| 5th leaching 394 ml | 1.27% 5.00 g | 0.51% 2.01 g | 1.84% 7.25 g | 0.59% 2.32 g | 1.16% 4.57 g |

The 5th leaching liquid was oxidized with $H_2O_2$ and then neutralized with caustic soda to a pH of 1.5, followed by passing through a cation exchange resin. The adsorbed ingredients were eluted with 10% $H_2SO_4$. The composition of the elute is shown in Table 13.

TABLE 13

| | | Elute: 400 ml | | |
|---|---|---|---|---|
| V | Mo | Co | Ni | Al |
| 0.05% | Nil | 1.27% | 0.41% | 0.80% |
| 0.02 g | Nil | 5.08 g | 1.64 g | 3.20 g |

The elute was subjected to electrodialysis to adjust the pH to 1.5 and then neutralized with aqueous ammonia to bring the pH to 4.5, followed by filtering out the resulting precipitate of $Al(OH)_3$. The composition of the filtrate is shown in Table 14.

TABLE 14

| | | Filtrate: 415 ml | | |
|---|---|---|---|---|
| V | Mo | Co | Ni | Al |
| Nil | Nil | 1.17% | 0.37% | Nil |
| Nil | Nil | 4.86 g | 1.52 g | Nil |

$(NH_4)_2SO_4$ (27.4 g) and $NH_4OH$ in an amount sufficient to provide a pH of 10.5 was added to the filtrate. The resulting aqueous solution containing ammonia complexed divalent nickel and cobalt was then oxidized with air and the oxidized solution was then adsorbed on a weakly acidic cation exchange resin. The adsorbed ingredients were eluted with an aqueous alkaline solution containing 0.25 mols of $(NH_4)_2SO_4$ and $NH_4OH$ sufficient to provide a pH of about 10 to elute initially a solution containing nickel. The solution was replaced by 5% $H_2SO_4$ at this stage to elute a solution containing cobalt exclusively. The compositions of each solution are shown in Table 15.

TABLE 15

| | Co | Ni |
|---|---|---|
| Nickel solution 2000 ml | 0.0002% 0.004 g | 0.07% 1.48 g |
| Cobalt solution 550 ml | 0.82% 4.53 g | 0.002% 0.01 g |

An aqueous solution of 10% caustic soda was then added to the respective resulting solutions of Co and Ni, and then they were decomposed under heating. The oxides or hydroxides obtained by the thermal decomposition were dissolved in dilute hydrochloric acid; then sulfuric acid was added and the resulting solution was concentrated to give cobalt sulfate and nickel sulfate.

The percent recovery of Ni and Co from the leaching liquid was 63.79% and 62.48%, respectively.

The percent recovery of Ni and Co from the used catalyst was 10.17% and 29.75%, respectively.

EXAMPLE 4

A used catalyst from the direct desulfurization of petroleum was roasted at 800° C. in an oxidative atmosphere. The roasted product had a composition as shown in Table 16.

TABLE 16

| V (%) | Mo (%) | Co (%) | Ni (%) | Al (%) |
|---|---|---|---|---|
| 13.3 | 6.5 | 0.72 | 3.4 | 32.4 |

To the roasted product (150 g) was added 15% aqueous solution of NaOH. 500 ml of an aqueous solution containing 5% by weight of $H_2SO_4$ and having a pH of 0.52 was added to the alkaline leaching residual (120 g) and leached at 60° C. for three hours under agitation. Immediately after the leaching, the reaction mixture was filtered. The filtrate had a pH of 0.82 and a temperature of 50° C. 50% $H_2SO_4$ and water was added to the filtrate to make 500 ml, so that the resulting solution had a pH of 0.52 and the leaching was repeated using the made-up solution similarly to the foregoing procedure. Table 17 shows the data obtained when such an leaching was repeated three times.

TABLE 17

| | V | Mo | Co | Ni | Al |
|---|---|---|---|---|---|
| 1st leaching 500 ml | 0.29% 1.45 g | 0.10% 0.5 g | 0.084% 0.42 g | 0.18% 0.9 g | 0.03% 0.17 g |
| 2nd leaching 526 ml | 0.65% 3.42 g | 0.24% 1.25 g | 0.19% 1.0 g | 0.29% 1.53 g | 0.07% 0.37 g |
| 3rd leaching 580 ml | 1.02% 5.92 g | 0.40% 2.32 g | 0.25% 1.45 g | 0.42% 2.44 g | 0.13% 0.76 g |

The percent leaching of V, Mo, Co, Ni and Al was 9.89%, 7.93%, 44.75%, 15.95% and 0.52% respectively.

The 3rd leaching liquid was oxidized with $H_2O_2$ and then neutralized with an aqueous ammonia solution to a pH of 4.9, thereby precipitate Al and some Mo and Co hydroxides. The resulting precipitate was filtered. The composition of the filtrate is shown in Table 18.

TABLE 18

| | | Filtrate: 620 ml | | |
|---|---|---|---|---|
| V | Mo | Co | Ni | Al |
| 0.28% | 0.07% | 0.19% | 0.36% | Nil |
| 1.72 g | 0.42 g | 1.17 g | 2.22 g | Nil |

An aqueous ammonia solution was added to the filtrate as indicated in Table 18 to adjust the pH to 10, thereby forming ammonia complexed divalent Ni and Co. After oxidized with air, the oxidized solution was contacted with a weakly acidic cation exchange resin. V and Mo components are not adsorbed on the weakly acidic cation exchange resin. The adsorbed ingredients were eluted with an aqueous alkaline solution containing 0.25 mol of $(NH_4)_2SO_4$ and $NH_4OH$ (pH: about 10) to elute initially a solution containing Ni. The solution was replaced by 5% $H_2SO_4$ at this stage to elute a solution containing Co exclusively. The composition of each solution are shown in Table 19.

TABLE 19

| | Co | Ni |
|---|---|---|
| Ni solution 3000 ml | 0.0004% 0.001 g | 0.07% 2.05 g |
| Co solution 500 ml | 0.18% 0.92 g | 0.008% 0.004 g |

The percent recovery of Ni and Co from the leaching liquid was 84.0% and 63.4%, respectively.

The percent recovery of Ni and Co from the used catalyst was 13.4% and 28.4%, respectively.

COMPARATIVE EXAMPLE 3

The alkaline leaching residual as shown in Example 3 was subjected to single acid leaching with 1% $H_2SO_4$, respectively. Table 20 shows results obtained together data obtained with a solution containing 2.5%, 5%, 7.5% and 10% $H_2SO_4$ in accordance with the present invention for facilitating comparison.

TABLE 20

| | V | Mo | Co | Ni | Al |
|---|---|---|---|---|---|
| 10% $H_2SO_4$ (Subject Invention) | 0.20% | 0.022% | 0.33% | 0.14% | 0.25% |
| | 1.02 g | 0.11 g | 1.68 g | 0.72 g | 1.25 g |
| 7.5% $H_2SO_4$ (Subject Invention) | 0.17% | 0.023% | 0.31% | 0.13% | 0.22% |
| | 0.94 g | 0.13 g | 1.68 g | 0.72 g | 1.21 g |
| 5% $H_2SO_4$ (Subject Invention) | 0.14% | 0.017% | 0.30% | 0.11% | 0.17% |
| | 0.78 g | 0.095 g | 1.68 g | 0.62 g | 0.95 g |
| 2.5% $H_2SO_4$ (Subject Invention) | 0.06% | 0.007% | .26% | 0.09% | 0.14% |
| | 0.37 g | 0.044 g | 1.62 g | 0.57 g | 0.88 g |
| 1% $H_2SO_4$ (Comparative Example) | 0.0009% | 0.0005% | 0.27% | 0.08% | 0.03% |
| | 0.005 g | 0.003 g | 1.52 g | 0.44 g | 0.19 g |

TABLE 21

| The percent leaching at 5% $H_2SO_4$ | | | | |
|---|---|---|---|---|
| V | Mo | Co | Ni | Al |
| 4.8 | 1.1 | 55.17 | 21.3 | 1.8 |

What is claimed is:

1. In a process for recovering molybdenum and vanadium from products obtained by oxidative roasting, at a temperature of from about 600° C. to about 950° C., of used catalysts from the hydrotreatment desulfurization of petroleum, the improvement which comprises:
   (a) subjecting said roasted products to hot water alkaline leaching at a temperature of from about 50° C. to about 100° C. in the presence of a caustic alkali, the amount of the free caustic alkali in the leaching liquid being adjusted to a level of from about 10% to about 30% by weight based on the weight of said leaching liquid;
   (b) separating the resulting aqueous leaching solution containing substantially all of the molybdenum and vanadium components from solids at a temperature of from about 50° C. to about 80° C. so as not to result in substantial deposition of the vanadium and molybdenum components;
   (c) cooling the resulting aqueous leaching solution from step (b) to a temperature of from about 0° C. to about 40° C. to precipitate and separate the vanadium component therefrom;
   (d) recycling the mother liquor resulting from said step (c) and containing mainly the molybdenum component to the hot water alkaline leaching in said step (a) to effect the hot water alkaline leaching of other roasted products while maintaining the alkali condition of said caustic alkali;
   (e) repeating the recycled leaching and separation under the condition that the molybdenum content accumulated in the mother liquor by said repeated leaching does not exceed about 7% by weight based on said mother liquor.

2. The process according to claim 1 wherein said hot water alkaline leaching in said step (a) is carried out at a temperature of from 55° C. to 80° C.

3. The process according to claim 1 wherein said hot solid-liquid separation in said step (b) is carried out at a temperature of from about 55° C. to 75° C.

4. The process according to claim 1 wherein said maintenance of free caustic alkalinity in said step (d) is carried out by replenishing the caustic alkali and water or by adding an aqueous caustic alkali solution at any point during the course after the separation of the solids in said step (c) to repeat the hot water alkaline leaching in said step (a).

5. The process according to claim 1, wherein in said step (e) mother liquor is removed.

6. In a process for recovering molybdenum, vanadium, cobalt and nickel from products obtained by oxidative roasting, at a temperature of from about 600° C. to about 950° C., of used catalysts and aluminum-containing catalyst carrier from the hydrotreatment desulfurization of petroleum, the improvement which comprises:
   (a) subjecting said roasted products to hot water alkaline leaching at a temperature of from about 50° C. to about 100° C. in the presence of a caustic alkali, the amount of free caustic alkali in the leaching liquid being adjusted to a level of from about 10% to about 30% by weight based on the weight of said leaching liquid;
   (b) separating the resulting aqueous leaching solution containing substantially all of the molybdenum and vanadium components and some aluminum component dissolved therein from solids including substantially all of the cobalt and nickel components and some aluminum component at a temperature of from about 50° C. to about 80° C. so as not to result in substantial deposition of the vanadium and molybdenum components;
   (c) cooling the resulting aqueous leaching solution from step (b) to a temperature of from about 0° C. to about 40° C. to precipitate and separate the vanadium component therefrom;
   (d) recycling the mother liquor resulting from said step (c) and containing mainly the molybdenum component to the hot water alkaline leaching in said step (a) to effect the hot water alkaline leaching of other roasted products while maintaining the alkali condition of said caustic alkali;
   (e) repeating the leaching and separation under the condition that the molybdenum content accumulated in the mother liquor by said repeated leaching does not exceed about 7% by weight based on said mother liquor;
   (f) reducing the pH of the mother liquor from said step (e) containing molybdenum component and some vanadium and aluminum components and having a pH of higher than 13 by electrodialysis to a pH between about 11 and about 13, then adjusting the pH of the resulting solution to a value ranging from about 7.5 to about 9.5 by adding sulfuric acid or hydrochloric acid and removing solids of aluminum component formed;
   (g) adding a water-soluble ammonium salt to the resulting liquor from said step (f) to convert the molybdenum component and some vanadium component to their ammonium salts by double decomposition thereof, the amount of the water-soluble ammonium salt being the sum of $NH_4^+$ of more than one mol per mol of vanadium component calculated as V and that of more than 2 mols per mol of molybdenum component calculated as Mo;

(h) separating the precipitated ammonium salt of vanadium component at a temperature of from about 40° C. to about 100° C.;

(i) cooling the residual mother liquor to about 0° C. from about room temperature to precipitate and separate the ammonium salt of molybdenum therefrom.

7. The process according to claim 6 wherein said hot water alkaline leaching in said step (a) is carried out at a temperature of from 55° C. to 80° C.

8. The process according to claim 6 wherein said hot solid-liquid separation in said step (b) is carried out at a temperature of from about 55° C. to 75° C.

9. The process according to claim 6 wherein said maintenance of free caustic alkalinity in said step (d) is carried out by replenishing the caustic alkali and water or by adding an aqueous caustic alkali solution at any point during the course after the separation of the solids in said step (c) to repeat the hot water alkaline leaching in said step (a).

10. The process according to claim 6 wherein the pH of said resulting solution in said step (f) is adjusted by adding sulfuric acid or hydrochloric acid to a value ranging from about 8 to about 9.

11. The process according to claim 6 wherein the water-soluble ammonium salt is selected from the group consisting of ammonium chloride, ammonium nitrate, ammonium sulfate, ammonium carbonate, ammonium acetate and ammonium oxalate.

12. The process according to claim 6 wherein the amount of the water-soluble ammonium salt in said step (g) is the sum of $NH_4^+$ of about one mol to three mols per mol of vanadium component calculated as V and that of about two mols to about three mols per mol of molybdenum component calculated as Mo.

13. The process according to claim 6 wherein the temperature in said step (h) is from about 50° C. to about 80° C.

14. The process according to claim 6, wherin in said step (e) mother liquor is removed.

15. In a process for recovering molybdenum, vanadium, cobalt and nickel from products obtained by oxidative roasting, at a temperature of from about 600° C. to about 950° C., of used catalysts and aluminum-containing catalyst carrier from the hydrotreatment desulfurization of petroleum, the improvement which comprises:

(a) subjecting said roasted products to hot water alkaline leaching at a temperature of from about 50° C. to about 100° C. in the presence of a caustic alkali, the amount of the free caustic alkali in the leaching liquid being adjusted to a level of from about 10% to about 30% by weight based on the weight of said leaching liquid;

(b) separating the resulting aqueous leaching solution containing substantially all of the molybdenum and vanadium components and some aluminum component dissolved therein from solids including substantially all of the cobalt and nickel components and some aluminum component at a temperature of from about 50° C. to about 80° C. so as not to result in substantial deposition of the vanadium and molybdenum components;

(c) subjecting the solids from said step (b) to hot water acid leaching at a temperature of from about 50° C. to about 100° C. in the presence of an acid selected from the group consisting of sulfuric acid and hydrochloric acid, the concentration of the free acid in the leaching liquid being adjusted to a level of from about 2% to about 10% by weight based on the weight of said leaching liquid;

(d) separating the resulting aqueous leaching solution containing cobalt, nickel and aluminum components, and some molybdenum and vanadium components from solid residue;

(e) recycling the aqueous leaching solution from said step (d) to the hot water acid leaching in said step (c) to effect the hot water acid leaching of other solids from said step (b) while maintaining the acid condition of said solution;

(f) repeating the recycled leaching several times and separating said leaching liquid;

(g) oxidizing the leaching liquid with an oxidizing agent, then neutralizing it with an alkali to a pH of from about 3.5 to about 5.5, thereby precipitaing aluminum, vanadium and molybdenum hydroxides;

(h) filtering the resulting precipitate of aluminum, vanadium and molybdenum hydroxides;

(i) adding an ammonium salt and ammonium hydroxide to the filtrate from step (h) to adjust the pH to from about 9 to about 11, thereby forming ammonia complexed divalent nickel and cobalt;

(j) oxidizing the aqueous solution containing ammonia complex ions of divalent nickel and cobalt with molecular oxygen or a molecular oxygen-containing gas to form selectively ammonia complex ion of trivalent cobalt;

(k) contacting the resulting solution with a weakly acidic cation exchange resin to adsorb the ammonia complex ions thereon, followed by eluting with a buffering solution containing a water-soluble ammonium salt under an ammonia alkaline condition to elute selectively the ammonia nickel complex ion and then eluting the ammonia cobalt complex ion.

16. The process according to claim 15 wherein said hot water alkaline leaching in said step (a) is carried out at a temperature of from 55° C. to 80° C.

17. The process according to claim 15 wherein said hot solid-liquid separation in said step (b) is carried out at a temperature of from about 55° C. to 75° C.

18. The process according to claim 15 wherein the concentration of the free acid in the leaching liquid in said step (c) is adjusted to a level of from about 4% to about 6% by weight based on the weight of said leaching liquid.

19. The process according to claim 15 wherein the oxidizing agent used in the step (g) is selected from the group consisting of $H_2O_2$, $NaClO$ and $KMnO_4$.

20. The process according to claim 15 wherein the alkali used in the step (g) is selected from the group consisting of sodium hydroxide, potassium hydroxide and ammonium hydroxide.

21. The process according to claim 15 wherein the ammonium salt used in the step (i) is selected from the group consisting of ammonium sulfate, ammonium nitrate, ammonium chloride, ammonium carbonate, ammonium acetate and ammonium oxalate.

22. The process according to claim 15 wherein the pH of the filtrate in the step (i) is adjusted to from about 9.5 to about 10.5.

23. The process according to claim 15 wherein the water-soluble ammonium salt used in the step (k) is selected from the group consisting of ammonium sulfate, ammonium nitrate, ammonium chloride, ammonium carbonate, ammonium phosphate, ammonium acetate and ammonium oxalate.

24. The process according to claim 15 wherein the concentration of the water-soluble ammonium salt used to elute the ammonium nickel complex in the step (k) is from about 0.4 mol to about 0.7 mol as $NH_4^+$ and the pH of the buffering solution therein is from about 9 to about 11.

25. The process according to claim 15 wherein the concentration of the water-soluble ammonium salt used to elute the ammonium cobalt complex in the step (k) is from about 0.7 mol to about 2.5 mols as $NH_4^+$.

26. The process according to claim 15 wherein the elute for the elution of the ammonium cobalt complex from the weakly acidic cation exchange resin in the step (k) is aqueous sulfuric acid or hydrochloric acid solution from about 5% to about 20% by weight based on the weight of the eluting solution.

27. The process according to claim 26 wherein the concentration of the elute is from about 5% to about 10% by weight.

28. In a process for recovering molybdenum, vanadium, cobalt and nickel from products obtained by oxidative roasting, at a temperature of from about 600° C. to about 950° C., of used catalysts and aluminum-containing catalyst carrier from the hydrotreatment desulfurization of petroleum, the improvement which comprises:
   (a) subjecting said roasted products to hot water alkaline leaching at a temperature of from about 50° C. to about 100° C. in the presence of a caustic alkali, the amount of the free caustic alkali in the leaching liquid being adjusted to a level of from about 10% to about 30% by weight based on the weight of said leaching liquid;
   (b) separating the resulting aqueous leaching solution containing substantially all of the molybdenum and vanadium components and some aluminum component dissolved therein from solids including substantially all of the cobalt and nickel components and some aluminum component at a temperature of from about 50° C. to about 80° C. so as not to result in substantial deposition of the vanadium and molybdenum components;
   (c) subjecting the solids from said step (b) to hot water acid leaching at a temperature of from about 50° C. to about 100° C. in the presence of an acid selected from the group consisting of sulfuric acid and hydrochloric acid, the concentration of the free acid in the leaching liquid being adjusted to a level of from about 2% to about 10% by weight based on the weight of said leaching liquid;
   (d) separating the resulting aqueous leaching solution containing cobalt, nickel and aluminum components, and some molybdenum and vanadium components from solid residue;
   (e) recycling the aqueous leaching solution from said step (d) to the hot water acid leaching in said step (c) to effect the hot water acid leaching of other solids from said step (b) while maintaining the acid condition of said solution;
   (f) repeating the recycled leaching several times and separating said leaching liquid;
   (g) oxidizing the leaching liquid with an oxidizing agent, then neutralizing it with an alkali to a pH of from about 1 to about 2 and passing it through a cation exchange resin, thereby adsorbing nickel, cobalt and aluminum components, but not adsorbing molybdenum and vanadium components;
   (h) eluting the adsorbed ingredients with about 5% to 30% by weight of sulfuric acid or hydrochloric acid and then subjecting the elute to electrodialysis to adjust the ph to about 1 to about 2;
   (i) neutralizing the resulting liquid from step (h) with an alkali and filtering the resulting precipitate of aluminum hydroxide;
   (j) adding an ammonium salt and ammonium hydroxide to the filtrate from step (i) to adjust the pH to from about 9 to about 11, thereby forming ammonia complexed divalent nickel and cobalt;
   (k) oxidizing the aqueous solution containing ammonia complex ions of divalent nickel and cobalt with molecular oxygen or a molecular oxygen-containing gas to form selectively ammonia complex ion of trivalent cobalt;
   (l) contacting the resulting solution with a weakly acid cation exchange resin to adsorb the ammonia complex ions thereon, followed by eluting with a buffering solution containing a water-soluble ammonium salt under an ammonia alkaline condition to elute selectively the ammonia nickel complex ion and then eluting the ammonia cobalt complex ion.

29. The process according to claim 28 wherein said hot water alkaline leaching in said step (a) is carried out at a temperature of from 55° C. to 80° C.

30. The process according to claim 28 wherein said hot solid-liquid separation in said step (b) is carried out at a temperature of from about 55° C. to 75° C.

31. The process according to claim 28 wherein the concentration of the free acid in the leaching liquid in said step (c) is adjusted to a level of from about 4% to about 6% by weight based on the weight of said leaching liquid.

32. The process according to claim 28 wherein the oxidizing agent used in step (g) is selected from the group consisting of $H_2O_2$, NaClO AND $KMnO_4$.

33. The process according to claim 28 wherein the alkali used in step (g) is selected from the group consisting of sodium hydroxide, potassium hydroxide and ammonium hydroxide.

34. The process according to claim 28 wherein the ammonium salt used in step (j) is selected from the group consisting of ammonium sulfate, ammonium nitrate, ammonium chloride, ammonium carbonate, ammonium acetate and ammonium oxalate.

35. The process according to claim 28 wherein the alkali used in step (j) is selected from the group consisting of sodium hydroxide, potassium hydroxide and ammonium hydroxide.

36. The process according to claim 28 wherein the pH of the filtrate in step (j) is adjusted to from about 9.5 to about 10.5.

37. The process according to claim 28 wherein the water-soluble ammonium salt used in step (e) is selected from the group consisting of ammonium sulfate, ammonium nitrate, ammonium chloride, ammonium carbonate, ammonium phosphate, ammonium acetate and ammonium oxalate.

38. The process according to claim 28 wherein the concentration of the water-soluble ammonium salt used to elute the ammonium nickel complex in step (l) is from about 0.4 mole to about 0.7 mol as $NH_4^+$ and the pH of the buffering solution therein is from about 9 to about 11.

39. The process according to claim 28 wherein the concentration of the water-soluble ammonium salt used to elute the ammonium cobalt complex in step (l) is from about 0.7 mol to about 2.5 mols as $NH_4^+$.

40. The process according to claim 28 wherein the elute for the elution of the ammonium cobalt complex from the weakly acidic cation exchange resin in step (l) is aqueous sulfuric acid or hydrochloric acid solution from about 5% to about 20% by weight based on the weight of the eluting solution.

41. The process according to claim 40 wherein the concentration of the elute is from 5% to about 10% by weight.

* * * * *

UNITED STATES PATENT AND TRADEMARK OFFICE
CERTIFICATE OF CORRECTION

PATENT NO. : 4,145,397
DATED : March 20, 1979
INVENTOR(S) : SHIGEO TOIDA et al

It is certified that error appears in the above-identified patent and that said Letters Patent are hereby corrected as shown below:

Column 3, line 49: before "separating", replace "of" with ---for---.

Column 7, line 31: delete "and some Mo and V components" (this material was printed twice).

Column 7, line 66: rewrite "treatedto" as ---treated to---.

Columns 11-12, Table 5: in the last two columns, 9th line, below "Ni", replace "0.0008%" with ---0.0009%---; and below "Al", replace "0.47%" with ---0.43%---.

Column 20, line 22 (Claim 28): replace "acid" with ---acidic---

Column 20, line 60 (Claim 37): replace "step (e)" with ---step (1)---.

Signed and Sealed this

Thirteenth Day of November 1979

[SEAL]

Attest:

RUTH C. MASON
Attesting Officer

LUTRELLE F. PARKER
Acting Commissioner of Patents and Trademarks